(12) United States Patent
Mori et al.

(10) Patent No.: US 7,136,153 B2
(45) Date of Patent: Nov. 14, 2006

(54) SCANNING RANGE SENSOR

(75) Inventors: Toshihiro Mori, Osaka (JP); Makoto Yamashita, Kyoto (JP)

(73) Assignee: Nidec Corporation, Kyoto (JP)

( * ) Notice: Subject to any disclaimer, the term of this patent is extended or adjusted under 35 U.S.C. 154(b) by 215 days.

(21) Appl. No.: 10/710,726

(22) Filed: Jul. 30, 2004

(65) Prior Publication Data

US 2005/0024625 A1    Feb. 3, 2005

(30) Foreign Application Priority Data

Jul. 31, 2003    (JP)    ............... 2003-284441

(51) Int. Cl.
*G01C 3/08*    (2006.01)

(52) U.S. Cl. .................... 356/4.01; 356/5.01

(58) Field of Classification Search ................. 356/4.01
See application file for complete search history.

(56) References Cited

U.S. PATENT DOCUMENTS

| | | | |
|---|---|---|---|
| 3,813,140 A | | 5/1974 | Knockeart |
| 5,416,321 A | * | 5/1995 | Sebastian et al. ........... 250/288 |
| 5,455,669 A | | 10/1995 | Wetteborn ................. 356/5.01 |
| 5,808,727 A | * | 9/1998 | Katayama .................. 356/4.01 |
| 5,949,530 A | | 9/1999 | Wetteborn ................. 356/5.01 |
| 5,991,011 A | | 11/1999 | Damm ....................... 356/5.01 |
| 6,265,725 B1 | | 7/2001 | Moll et al. ............. 250/559.38 |
| 6,411,374 B1 | | 6/2002 | Nakase et al. |
| 6,480,270 B1 | | 11/2002 | Studnicka et al. ....... 356/141.1 |
| 6,687,033 B1 | | 2/2004 | Pierenkemper ............. 359/196 |
| 2001/0035946 A1 | * | 11/2001 | Nakase et al. ............. 356/4.01 |

FOREIGN PATENT DOCUMENTS

| | | |
|---|---|---|
| JP | S62-254008 A | 11/1987 |
| JP | H07-191142 A | 7/1995 |
| JP | H07-209080 A | 8/1995 |
| JP | H10-132934 A | 5/1998 |
| JP | H11-166969 A | 6/1999 |
| JP | 2000-028715 A | 1/2000 |
| JP | 2000-162318 A | 6/2000 |

* cited by examiner

*Primary Examiner*—Thomas H. Tarcza
*Assistant Examiner*—Luke Ratcliffe
(74) *Attorney, Agent, or Firm*—James Judge (57) ABSTRACT

A scanning range sensor includes an outer cover having a transparent window that is horizontally annular, a vertical type cylindrical rotary member inside the outer cover, a light receiving window with an optical lens of the cylindrical rotary member, a light projector between the outer cover and the cylindrical rotary member, an optical system for leading light from the light projector along the direction of the rotational axis of the cylindrical rotary member by the mirrors on the inner surface of the cylindrical rotary member, a photodetector that within the interior of the cylindrical rotary member is fixed and arranged separately from the cylindrical rotary member so as to coincide with the rotational axis of the cylindrical rotary member and is connected to a distance computation circuit, and a reflecting mirror and scanning mirror along the rotational axis of the cylindrical rotary member.

21 Claims, 6 Drawing Sheets

Prior Art

FIG. 6

Prior Art

SCANNING RANGE SENSOR

BACKGROUND OF INVENTION

1. Technical Field

The present invention relates to so-called scanning range sensors, which use a rotating or vibrating mirror or an equivalent to scan an object with a light beam within a predetermined angle range, and which receive light reflected by the object

2. Description of the Related Art

Figure 5:
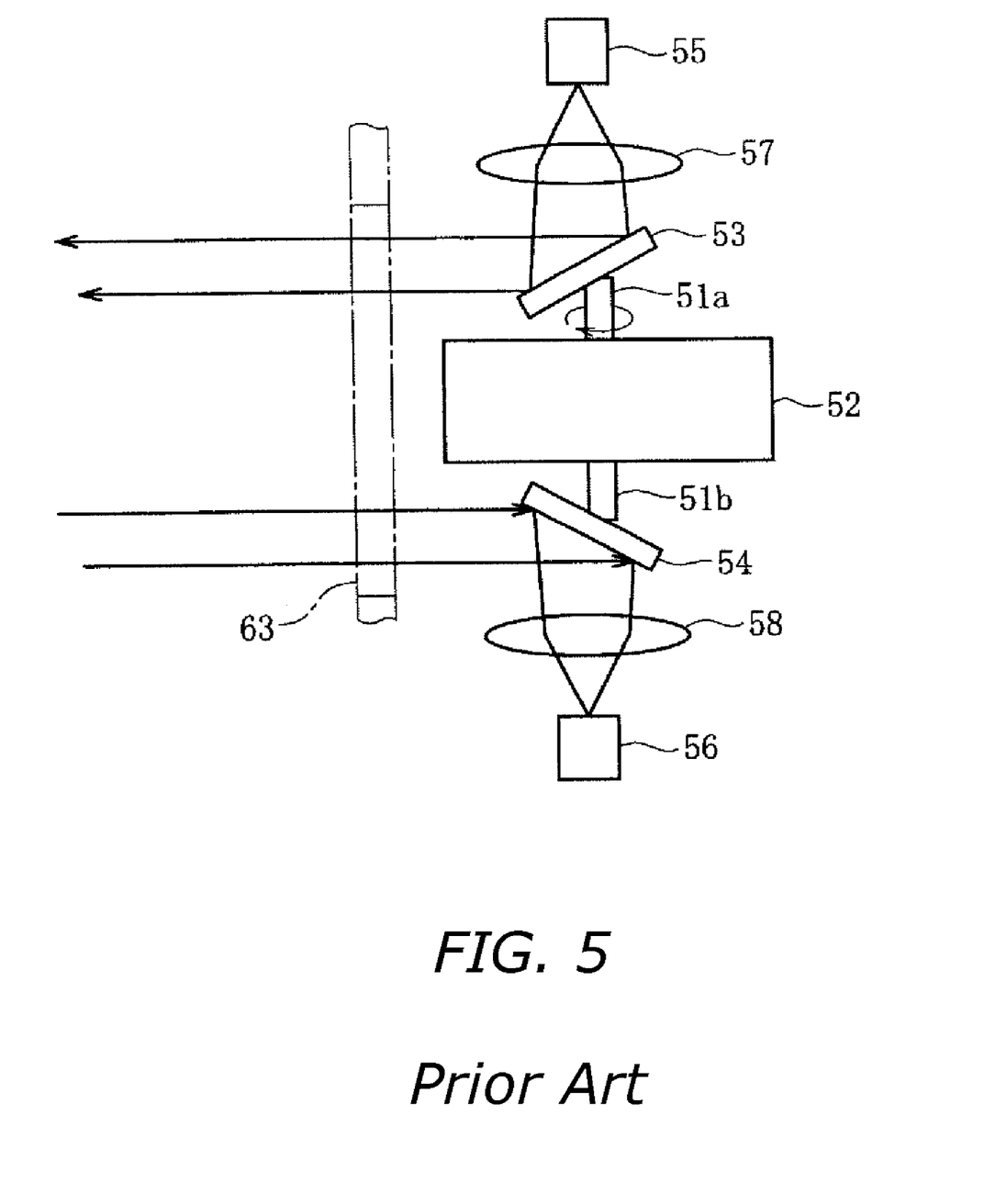
FIG. 5 is an idealized diagram of a conventional scanning range sensor.
Figure 6:
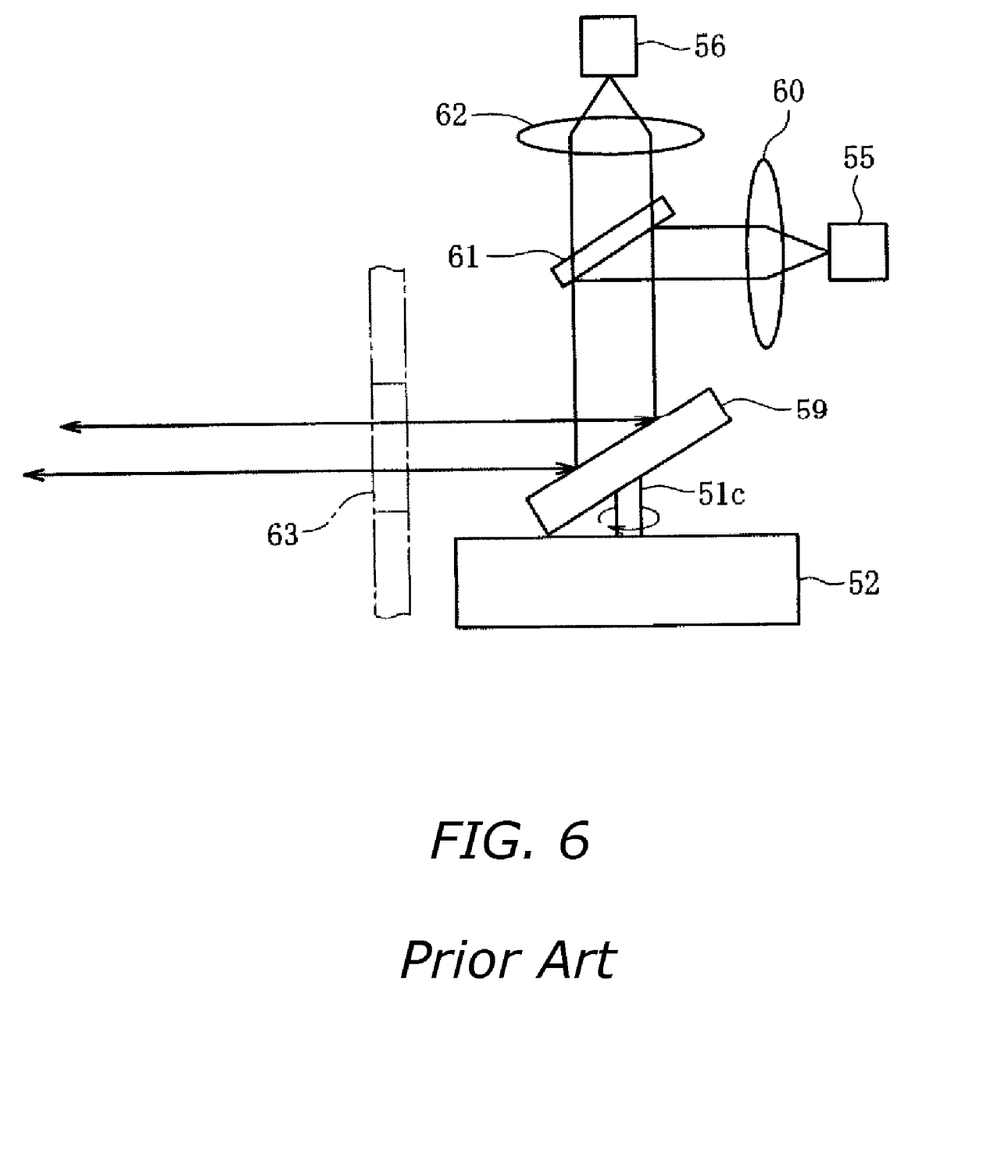
FIG. 6 is an idealized diagram of another conventional scanning range sensor.

There are two different configurations, as shown respectively in FIGS. 5 and 6, known as a scanning range sensor that uses a rotating mirror for deflecting the axis of an optical beam over a full, 360-degree range of angles. Both configurations have a mirror whose optical axis coincides with the axis of a motor for rotating the mirror.

The configuration shown in FIG. 5 uses a motor 52 having rotary shafts 51a and 51b that constitute a common shaft and extend upward and downward, respectively. A scanning mirror 53 and a reflecting mirror 54 are attached to respective shafts 51a and 51b so as to have identical phase. At numeral 55 in FIG. 5 is a light transmitter, at numeral 56 is a photodetector, at numerals 57 and 58 are lenses, and at numeral 63 is a light exit/entrance window 63. There are two advantages to this configuration. One is that there is little diffraction of light from the scanning optics to the receiving optics, because the scanning optics and the receiving optics are completely separate from each other. Another advantage is that the photosensitivity of the sensor can be raised because there is no possibility of stray light being reflected by the inner surface of, or by dust particles on, the exit/entrance window 63 and then entering the photodetector 56.

The sensor section of the scanning range sensor configuration shown in FIG. 6 has a motor 52 with a rotary shaft 51c protruding upward and a light scanning/reflecting mirror 59 that is attached to the rotary shaft 51c. Light from the light transmitter 55 passes through a lens 60, is reflected downward by a half-silvered mirror 61, and enters the scanning/reflecting mirror 59. This reflected light is reflected by the scanning/reflecting mirror 59, passes through the half-silvered mirror 61, passes through a lens 62, and enters the photodetector 56. There are two advantages to this configuration. One is that there is no blind spot for an object even at a close distance from the sensor because one mirror 59 is used in common for both the scanning and the reflecting mirror. Another advantage is that when the sensor is installed in a device such as a robot, a high flexibility in installation can be obtained, for the reason just given.

However, there are some drawbacks to the configuration shown in FIG. 5.

First, since the motor 52 is positioned between the scanning mirror 53 and the reflecting mirror 54, the distance between the optical axes of the scanning optics and the receiving optics is large. Therefore, if a target object is positioned within close range, light reflected from the object does not enter the photodetector 56, resulting in the occurrence of a blind spot.

Secondly, the fact that the scanning and receiving optics are situated respectively above and below the motor renders the sensor as a unit elongate vertically. Meanwhile, the center of the two optical systems is coincident with the center of the sensor. Therefore, when installing the vertically elongate sensor in a device, its center must be the optical axis. This limits the degrees of freedom for installation in a device. In particular, if the sensor is to be installed in a low-profile device, a drawback is that the outward-extending portions are large.

In addition, there are a few drawbacks to the configuration shown in FIG. 6.

First, the half-silvered mirror 61 is employed to make the optical axes of the scanning optics and the receiving optics identical to each other. However, the amount of light is reduced by half after being separated by the half-silvered mirror 61. Therefore, the power of the laser in the light transmitter 55, and the amplifying capability of the photodetector 56 must be enhanced by four times in total compared with an implementation in which the scanning optics and the receiving optics are separated as shown in FIG. 5.

Secondly, the fact that the single scanning/reflecting mirror 59 is used means that the scanning beam may be reflected by the inner surface of, or by dust particles on, the light exit/entrance window 63, in which case the stray reflected light can enter the photodetector 56 after being transmitted by the scanning/reflecting mirror 59 and passing through the half-silvered mirror 61. If the photodetector 56 is of enhanced photosensitivity, the stray reflected light may generate noise that becomes added to image information. Consequently, the photosensitivity cannot be heightened without compensating for it.

SUMMARY OF INVENTION

An object of the present invention is to shorten the distance between the optical axis of the beam projected from a scanning range sensor toward an object and the optical axis of light reflected by the object into the sensor, thus to make it possible to prevent the sensor from having a blind spot even when the distance from the sensor to the object is short.

Another object of the present invention is to separate the scanning optical system from the receiving optical system, thus to make it possible to prevent the sensor from being disturbed by noise due to stray light reflected by the transmitting and receiving windows or by dust particles on the transmitting and receiving windows, to allow the photosensitivity of the sensor to be enhanced.

In order to achieve these objects, a scanning range sensor in one aspect of the present invention has a structure including: a light receiving section situated on or near a stationary shaft of the motor, in a location where the center of the light receiving section coincides with the rotational axis of the motor; a rotary component having, surrounding the light receiving section, an top wall portion and a circumferential wall potion; and a motor drive mechanism for driving the rotary component. In addition, a scanning optical system for generating a scanning beam directed on the sensing target, and a receiving optical system for guiding to the light receiving section light reflected by the object are provided individually on the top wall portion of the rotary component. As an example of the specific means for realizing the separation of the scanning and receiving optics, the scanning mirror and the reflecting mirror are constructed as entities separate from each other. In addition, scanning and receiving windows are provided along and in the circumferential wall potion of the rotary component for passing the scanning beam and the reflected light.

In this embodiment, the top wall portion and the circumferential wall portion not only may be walls constituted by boards having a close-packed structure, but also, for example, by mesh constructed with support columns extending along the rotational axis and radially.

Another scanning sensor according to the present invention has the following structure in addition to the above structure. Namely, image signals obtained by the light receiving section go through space inside the stationary shaft of the motor and are led to an external computation circuit. Then, in order to calculate the position or related information on the object from the image signal, a motor rotational position signal is also led to the external computation circuit via the inside of the motor stationary shaft.

In a conventional scanning sensor configuration, the scanning mirror and the reflecting mirror are configured for being connected directly to the rotary shaft of the motor as shown in FIG. 5 and FIG. 6. For this reason, there was no alternative to separating the scanning optical system from the receiving optical system on the upper and the lower sides of the motor, or to integrating them by using a half-silvered mirror. Adopting a configuration according to the present aspect of the invention makes it possible to dispose the photodetector and the light projector to one side of the motor without using a half-silvered mirror. Thus, the scanning and receiving optical systems can be integrated, while a scanning range sensor in which the distance between the optical axis of the beam projected from the sensor toward an object and the optical axis of light reflected by the object into the sensor is short can be realized. It should be understood that the light receiving section can be structured by disposing a photoelectric conversion element where the light receiving section is situated, or by collecting the received light and through an optical fiber or the like sending the collected light to another unit for carrying out photoelectric conversion and other processes.

In addition, a representative application of a scanning sensor according to the present invention is as a visual sensor for a robot or the like. Therein, the scanning optical axis and the receiving optical axis extend substantially horizontally. The motor rotary shaft on the other hand extends substantially vertically. At least the light reflected by the reflecting mirror is guided along the rotational axis of the motor to the light receiving section. Meanwhile, the scanning beam is emitted by the light projector (a light source) provided separately and is guided along the rotational axis of the motor so that the scanning mirror disposed on the top wall portion of the rotary component converts the orientation of the scanning beam into substantially horizontal.

According to this configuration, the present invention has the following effects.

(1) Since the scanning mirror is separated completely from the reflecting mirror, it is possible to prevent diffraction of light and undesired reflection of light due to dirt particles on the light transmitting and receiving windows, which allows the photosensitivity of the sensor to be maximally enhanced. In particular, when scanning using a laser, a limitation on the power of the light source in the light projector is that it cannot be increased over a predetermined value for assuring safety to the human eye. Therefore, it is a significant advantage that the sensing distance can be increased over what has been conventional using a light source of the same power.

(2) In addition, the scanning optical axis of the beam from the sensor toward an object and the receiving optical axis of light reflected by the object into the sensor can be close to each other. Therefore, a size of the blind spot can be decreased to a extent such that it presents no problems in practical use even if a target object is close to the sensor.

(3) The scanning mirror and the reflecting mirror are disposed on the same side with respect to the photodetector along the rotational axis of the motor. Therefore, there is high flexibility for placing the sensor inside a device. Especially in the case of a robot or an automatic guided vehicle (AGV) having a low profile, the position of objects can be detected omnidirectionally with merely a tip portion of the sensor extended from the device. Therefore, this is an advantageous form for a sensor when the sensor is used in a cleaning robot that moves around freely under chairs and tables.

(4) What are disposed on the rotary, moving component are only such optical elements as the scanning mirror, the reflecting mirror, and a rotational-angle detecting device such as an encoder or a resolver. Thus it is unnecessary to mount any electrical devices, such as a light receiving element, on the rotary component. Therefore, a design with high reliability can be implemented, and maintenance is facilitated.

(5) Optical systems and the photodetector as necessary for the scanning range sensor can be located efficiently within the motor. Therefore, a very small and compact sensor can be realized.

(6) Wires for output signals of from photodetector and the rotational position detector can be led to an external distance computation circuit via a through-hole inside the stationary shaft of the motor, so a very small and compact outer form can be realized compared with what has been conventional.

From the following detailed description in conjunction with the accompanying drawings, the foregoing and other objects, features, aspects and advantages of the present invention will become readily apparent to those skilled in the art.

DETAILED DESCRIPTION

Hereinafter, three embodiments of the present invention will be described with reference to the attached drawings.

First Embodiment

Figure 1:
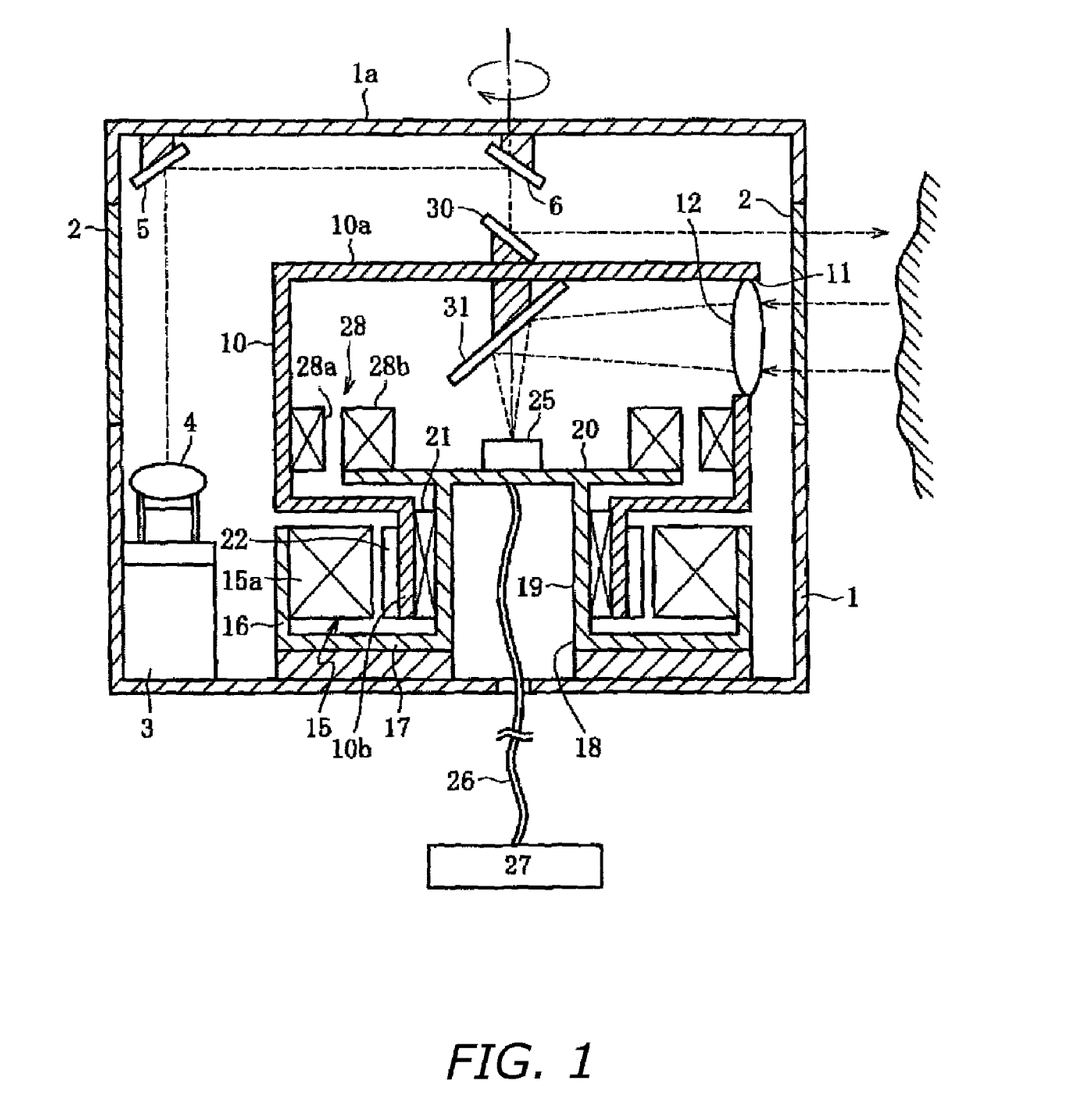
FIG. 1 is a vertical cross section of a scanning range sensor according to the present invention.
Figure 2:
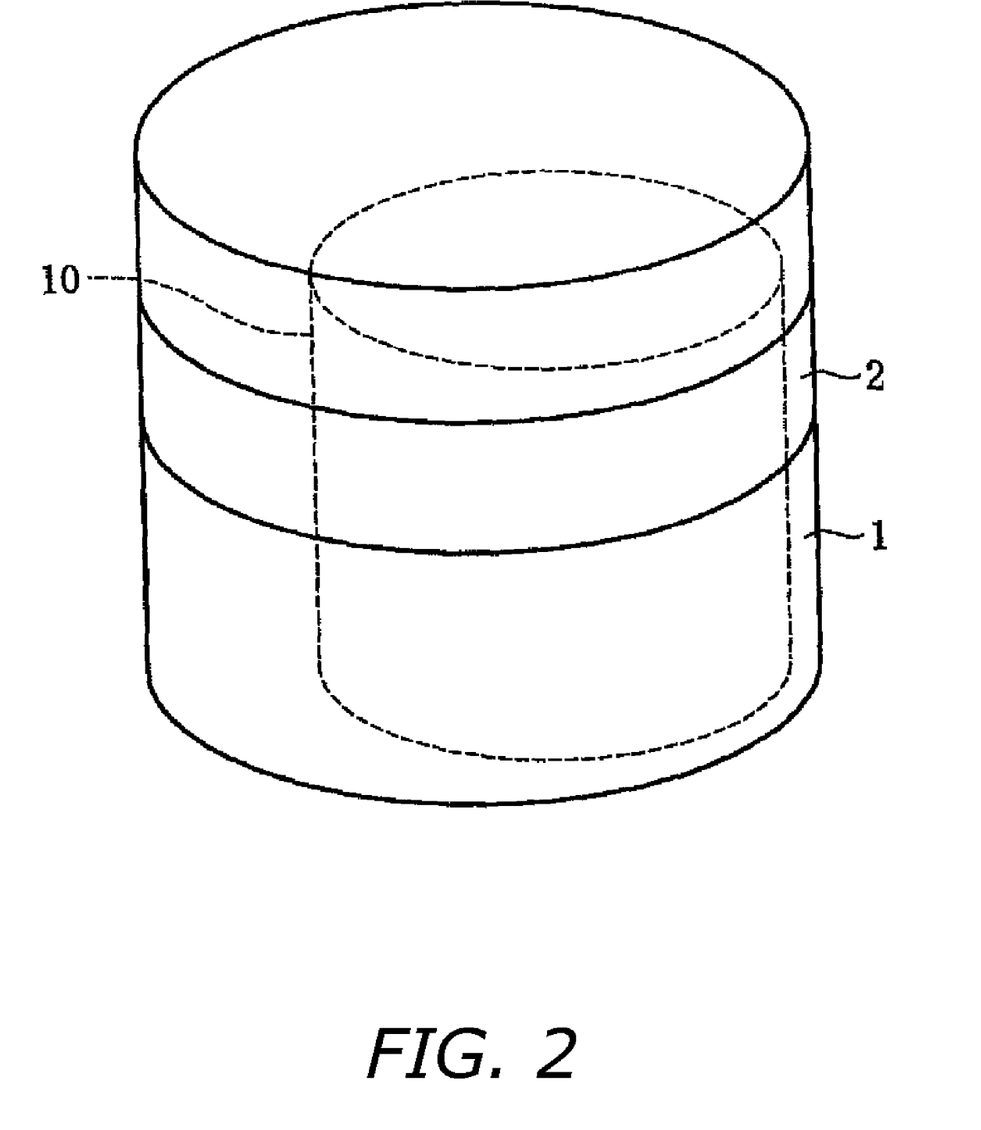
FIG. 2 is a perspective view of the outer form of the scanning range sensor according to the present invention.
Figure 3:
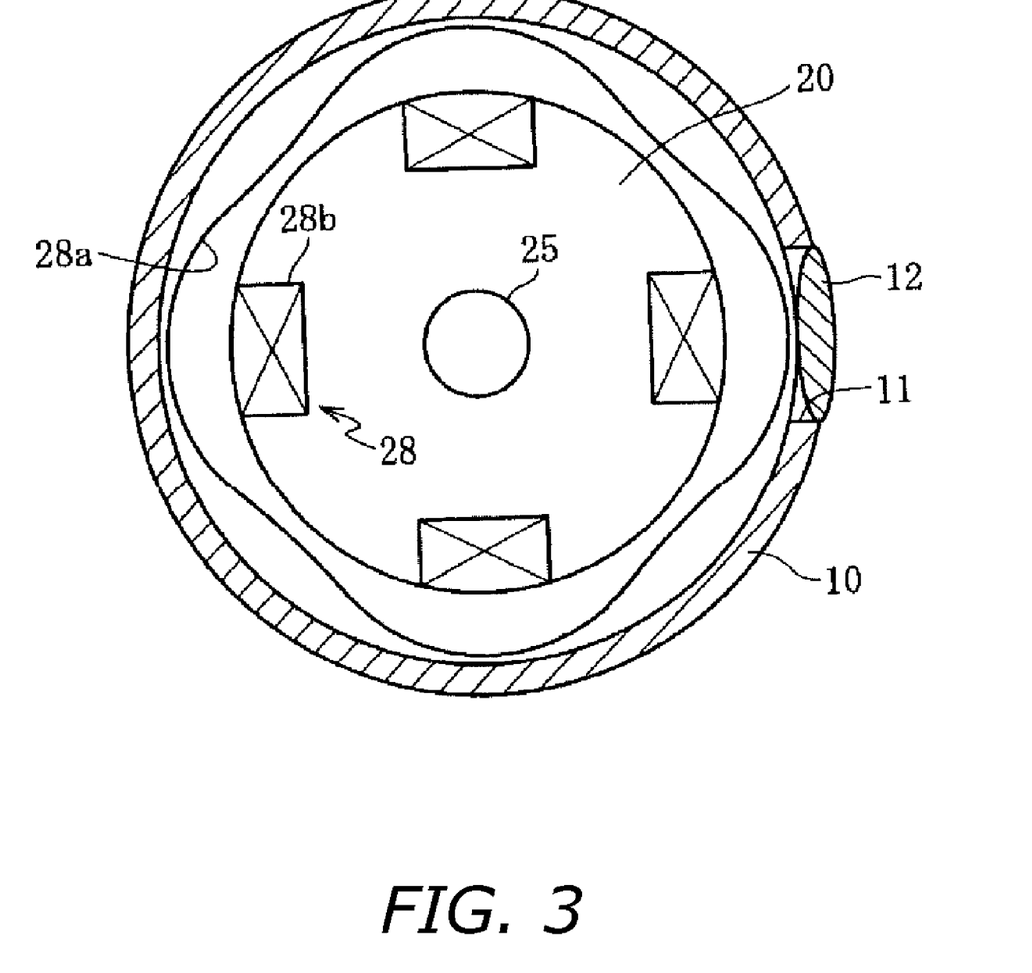
FIG. 3 is a horizontal cross section of a cylindrical rotary member of the scanning range sensor according to the present invention.

First, FIGS. 1–3 show a first example of the present invention. In this example, a vertically cylindrical outer cover 1 houses a main body of a scanning range sensor. When using the scanning range sensor of the present invention for a guarding robot or a cleaning robot, the outer cover 1 is placed on the top of the head portion of the robot. The outer cover 1 is made of an appropriate material such as a synthetic resin. As indicated in FIGS. 1 and 2, midway height-wise along the circumferential wall of the outer cover 1, a transparent window 2 that has a horizontally annular form and a uniform vertical width is formed slightly above center. This transparent window 2 may be made of a transparent, annularly seamless, band-shaped constituent separate from the main material of the outer cover 1 and set into position as the transparent window. Alternatively, the outer cover 1 itself may be formed integrally of a transparent material, and then a portion except for the transparent window may be painted. Note that it is possible to make the entire of the outer cover 1 transparent so that the area of the transparent window is widened to the entirety. In that case, however, it would be necessary to prevent undesired external light from entering the photodetector.

As shown in FIG. 1, inside the outer cover 1, a light projector 3 is arranged at a position adjacent to the inner surface of the circumferential wall of the outer cover 1 so as to project light vertically upward. This light projector 3 has a light source such as a laser or an LED. An optical lens 4 for making the diameter of the beam constant is disposed at the upper end of the light projector 3. A first mirror 5 is fixed to the inner surface of the top plate 1a of the outer cover 1 and is positioned right above the light projector 3, while a second mirror 6 is fixed to the center position of the inner surface of the same top plate 1a. These mirrors 5 and 6 are arranged so that the first mirror 5 is inclined to the right—in terms of the orientation of the drawing—approximately 45 degrees from the vertical direction and the second mirror 6 is inclined to the left approximately 45 degrees.

A cylindrical rotary member 10 is disposed in the outer cover 1 at a position shifted a little to the right in the FIG. 1 representation. This cylindrical rotary member 10 is made of an appropriate material such as a synthetic resin, and a light receiving window 11 having a circular shape is formed at an upper portion of the circumferential wall. An optical lens 12 is fixed into this light receiving window 11 and is adjusted so that its optical axis coincides with the radius there of the cylindrical rotary member 10. The lower portion of the cylindrical rotary member 10 has a rotating-member lower end portion 10b that has a reduced outer diameter. Meanwhile, a motor 15 is disposed in the bottom portion of the outer cover 1. This motor 15 includes a stator 15a having a winding coil and a core, a cylindrical portion 16 along the inner circumferential surface of which the stator 15a is fixed, a base plate portion 17 that is disposed in parallel with the bottom portion of the outer cover so as to form an inner bottom surface of the cylindrical portion 16, a motor stationary shaft 19 that is formed in the center of the base plate portion 17, and a horizontal disk portion 20 that is fixed to the upper end of the stationary shaft 19. In addition, a hollow through-hole 18 is proved inside the motor stationary shaft 19 so as to extend in the vertical direction.

An inner circumferential surface of a bearing 21 is fixedly fitted to an outer cylindrical surface of the motor stationary shaft 19, and an inner cylindrical surface of the rotating-member lower end portion 10b of the cylindrical rotary member 10 is rotatably engaged with the outer circumferential surface of the bearing 21. The bearing 21 can be a ball bearing or a slide bearing, for example. In addition, magnets 22 are attached to the outside cylindrical surface of the rotary member lower end portion 10b so as to face the stator 15a via a slight gap. An external power source (not shown) supplies the stator 15a with a switching current so that a rotating magnetic field is generated in the stator's inner cylindrical space. This rotating magnetic field and the magnets 22 that are disposed at the lower end outer circumferential portion of the cylindrical rotary member 10 are attracted by each other, wherein a rotary drive force is generated between them. Note that this motor is not limited to being a brushless DC motor but may be a synchronous motor or the like.

A photodetector 25 is disposed along the rotational axis of the motor on the upper surface of the disk portion 20 as shown in FIGS. 1 and 3. This photodetector 25 is constituted by an optical sensor such as a photodiode, and the focal point of the optical lens 12 is adjusted to lie on the photodetector 25. The photodetector 25 is connected via a signal wire 26 to a distance computation circuit 27 that is disposed outside the outer cover 1 (in a control portion of the guarding robot or cleaning robot). A resolver 28 is arranged surrounding the photodetector 25 on the upper surface of the disk portion 20 for detecting precisely the rotational angle of the cylindrical rotary member 10. This resolver 28 includes: an undulating surface 28a as a rotor, made of a magnetic material and being, e.g., four smooth contours formed along the circuit of the inner circumferential surface of the cylindrical rotary member 10; and a resolver stator 28b opposed to the undulating surface 28a and having windings along the upper outer circumferential surface of the disk portion 20. By detecting change in permeance between the resolver stator 28b and the undulating surface 28a, the resolver 28 functions to detect the rotational position of the motor with high accuracy. The resolver 28 has a structure that is simpler than a rotary encoder or the like, so it has good durability, good reliability and low cost. Note that a simpler rotational position detector can be realized by providing a mechanism for generating a pulse per rotation of the cylindrical rotary member, and by dividing the pulse signal using a PLL circuit. In that case, the resolver 28 would not be necessary. Note that the mechanism for generating the pulse may be realized by providing a Hall sensor at a position that is adjacent to the magnet 22 on the base plate portion 17 or by placing a photoreceptor in the vicinity of the transparent window 2 for the transmitted light, for example.

A scanning mirror 30 and a reflecting mirror 31 are attached to the top plate portion 10a of the cylindrical rotary member 10 so that the optical axes thereof coincide with the rotational axis. The scanning mirror 30 and the reflecting mirror 31 are disposed so as to incline respectively to the left and the right by approximately 45 degrees each from the vertical. The beam from the light projector 3 is reflected by the second mirror 6 downward and is incident on the scanning mirror 30 with the optical axis coincident with the rotational axis. Then, the reflected light is radiated substantially in the horizontal direction, to outside the cylindrical rotary member 10 in the radial direction. Meanwhile, light having entered the cylindrical rotary member 10 substantially in the horizontal direction through the optical lens 12 of the light receiving window 11 is reflected downward by the reflecting mirror 31 with the optical axis coincident with the rotational axis, and becomes focused so that its focal point is on the center of the photodetector 25.

Next, operation of a scanning range sensor having the foregoing configuration will be described below. The scanning mirror 30 rotates at a high speed together with the cylindrical rotary member 10. Therefore, a beam having been projected by the light projector 3 and reflected by the scanning mirror 30 after passing through the first mirror 5 and the second mirror 6 is scanned continuously over the entire circuit of peripheral space through the transparent window 2 in the outer cover 1, so as to scan external objects continuously. Then, the light reflected by the objects enters the outer cover 1 through the transparent window 2 to be incident on the reflecting mirror 31 substantially in the horizontal direction after passing through the optical lens 12 in the light receiving window 11. After that, the light is reflected downward along the rotational axis by the reflecting mirror 31, and is focused on the photodetector 25, which converts quanta of the light into an electric signal (a phase signal). This electric signal is sent to the distance computation circuit 27 via the signal wire 26. Meanwhile, the resolver 28b detects the rotational angle of the cylindrical rotary member 10 when the photodetector 25 receives the light, and information on the rotational angle is also sent to the distance computation circuit 27 via the signal wire 26. The distance computation circuit 27 calculates the distance to the objects in accordance with the phase signal and generates a plane two-dimensional map by combining the distance and the rotational angle information from the resolver 28. Thus, a two-dimensional distribution or a two-dimensional contour of objects throughout 360 degrees around the rotational axis of the cylindrical rotary member 10 is determined, so that basic data can be obtained for deciding direction in which and distance to which a guarding robot or a cleaning robot, for example, can move. A scanning range sensor can be realized that has an outer shape much smaller and more compact than the conventional one by the effective and close arrangement of the motor and the optical system.

In addition, the light projector is disposed inside the outer cover, and the beam from the light projector is reflected by the mirror on the inner surface of the outer cover so as to enter the scanning mirror of the rotary member along the direction of the rotational axis. Thus, the scanning optics is completely separate from the receiving optics, so that reflected light arising in the scanning optics does not enter the receiving optics. This configuration is advantageous for allowing photosensitivity to be increased.

In addition, for distance measurements in a two-dimensional or three-dimensional region the scanning angle of the beam must be precisely detected scanning over 360 degrees. In the present invention, polar teeth are provided on the cylindrical rotary member of the resolver for detecting the rotational angle, and the stator of the resolver is supported together with the photodetector. Thus, the rotational angle of the cylindrical rotary member can be detected precisely, and the cylindrical rotary member has only optical elements such as its mirror and polar teeth of the resolver, which do not require electricity. Therefore, durability and reliability of the range sensor can be improved substantially.

Second Embodiment

Figure 4:
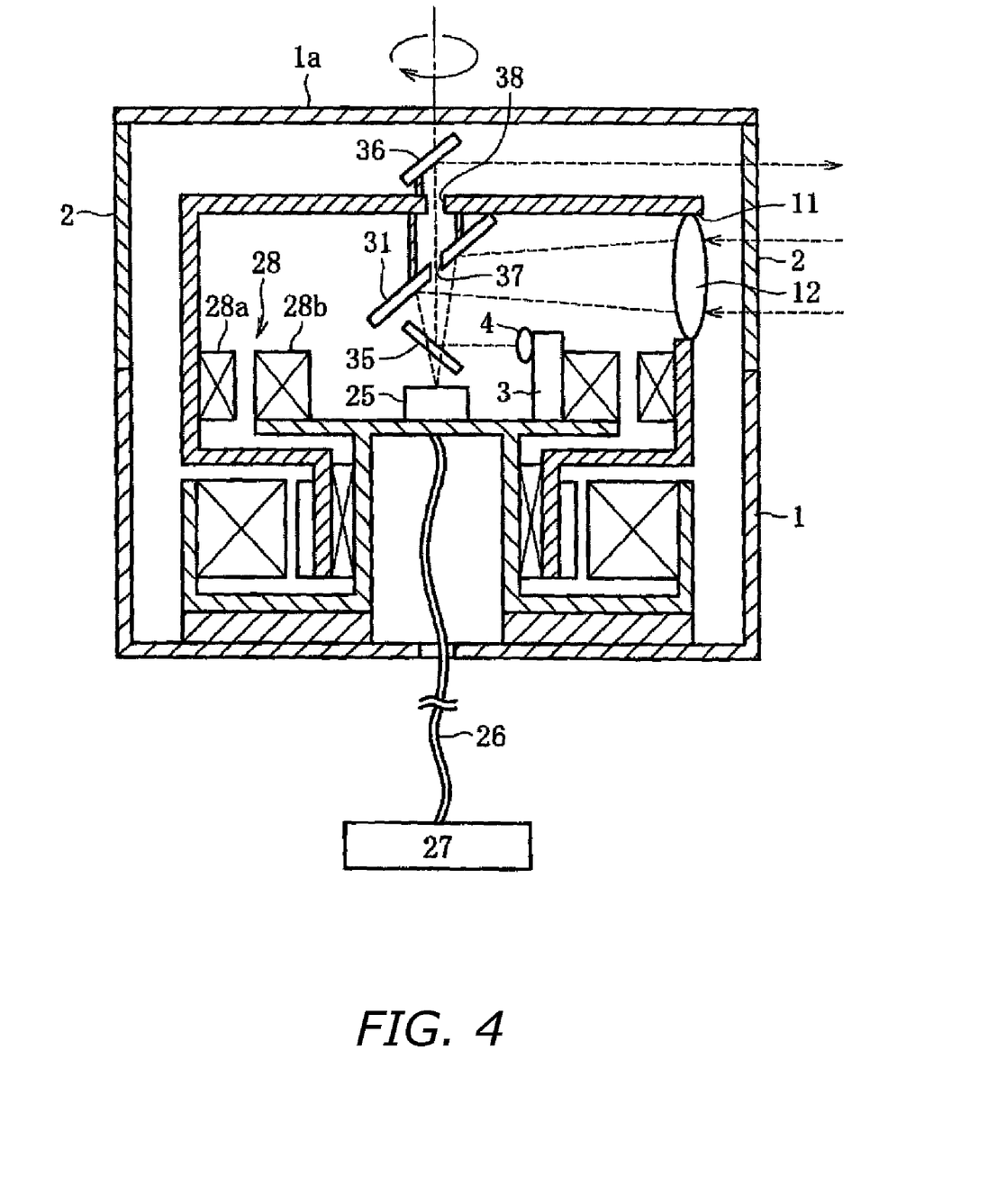
FIG. 4 is a vertical cross section of a scanning range sensor according to a modification of the present invention.

Next, a second embodiment of the present invention will be described with reference to FIG. 4. This example is a variation in which the light projector 3 is arranged on the disk portion 20 inside the cylindrical rotary member 10. Because a half-silvered mirror 35 is used, if a laser is used as a light source, the photosensitivity must be limited for safety by restricting the output power. On the other hand, however, a significant advantage to this configuration is that the vertical height of the scanning range sensor can be further decreased because it is possible to eliminate the mirrors 5 and 6 on the inner surface of the outer cover 1 shown in FIG. 1. In FIG. 4, the beam reflected upward by the half-silvered mirror 35 is incident upon the lower surface of the scanning mirror 36 through a tiny optical through-hole 37 in the center of the reflecting mirror 31, and a tiny optical through-hole 38 in the center of the top plate portion 10a of the cylindrical rotary member 10 along the rotational axis of the cylindrical rotary member 10. The scanning mirror 36 is inclined to the right of the vertical by approximately 45 degrees, so that a beam incident on the scanning mirror 36 from directly below is reflected substantially in the horizontal direction to exit the transparent window 2. The remainder of the configuration is similar to that shown in FIG. 1.

In this example, a beam from the light projector 3 passes through the half-silvered mirror 35, the optical through-hole 37 and the optical through-hole 38, is deflected by the scanning mirror 36 and passes through the transparent window 2 to enter peripheral space; meanwhile light reflected from objects passes through the transparent window 2 and the optical lens 12, is reflected by the reflecting mirror 31 and passes through the half-silvered mirror 35 to be received by the photodetector 25. Generation of the two-dimensional map after that is the same as described above with reference to FIG. 1.

In the above configuration, the photosensitivity is lowered a little because a half-silvered mirror is used. However, since the scanning light and receiving light are separated from each other, there is no possibility that an inwardly reflected component of the scanning light will enter the photodetector. In addition, the range sensor can be made more compact because the light projector is disposed inside the cylindrical rotary member. Furthermore, the height of the range sensor can be further decreased because it is not necessary to attach a mirror to the inside of the outer cover.

Other Common Features

Though the above-described light projector typically uses a laser as the light source, it is possible to use an LED as the light source. A laser has little dispersion of light, and thus can pass through a narrow path easily. Therefore, the shape of the sensor can be minimized. When using an LED instead of a laser, it is better to use an LED that can be modulated at high frequency. An LED is more advantageous than a laser because an LED has a larger light spot than a laser, which is limited in power for safety reasons.

In addition, though the method for measuring the distance to objects is not limited, an AM modulation method is typically adopted. The AM modulation method is a method in which laser light or LED light is modulated at a constant frequency, and the distance is determined from the difference between the phase of the modulated signal and the phase of light reflected by an object. Namely, if a beam that is modulated at a frequency f is reflected by an object and comes back, the return beam will have a phase difference $\phi$ that is determined by the speed of light and the distance. The value of the phase difference $\phi$ depends on the speed of light c and the distance L. Therefore, if the phase difference $\phi$ is detected, the distance L can be determined. Accordingly, by rotating the scanning beam over 360 degrees in the horizontal direction using a scanning mirror, distance measurements within a two-dimensional area can be performed. The present invention can be applied to a two-dimensional range sensor. However, distance measurements within a three-dimensional region are also possible by scanning the scanning beam over a 360-degree circuit while continuously increasing or decreasing the vertical angle of the scanning mirror. In the case of the three-dimensional measurement, peripheral space may be scanned by the beam in a helical fashion, for example.

Though embodiments of the present invention have been described above, a scanning range sensor of the present invention is not limited to these embodiments, but various modifications can be added to the examples within the scope of the present invention. For example, it is possible to dispose the light projector 3 shown in FIG. 1 so as to contact a cylindrical portion 16 that is made of a metal such as aluminum having a high thermal conductivity and is located on the outer circumferential portion of the stator 15a of the motor 15, so that the light projector 3 can be cooled easily. Although the motors in the foregoing embodiments are considered to rotate in one direction at a constant speed, it is possible to control the motor 15 to rotate reversibly within a predetermined angle range. In this case, the range sensor scans an object only through a predetermined span that is an extension of the outer circumference. Furthermore, it is possible to realize wide angle scanning over a wide range vertically, i.e., three-dimensional scanning, by inclining and vibrating the entire sensor including the outer cover 1 around the rotational axis of the motor 15 with a predetermined periodicity.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A scanning range sensor for determining distance to an object by scanning a beam from a light projector onto the object and receiving in a light receiving section connected to a distance computation circuit light reflected from the object, the scanning range sensor comprising:
   a light projector having a light source;
   a rotary member separate from said light projector and rotative about a rotational axis, said rotary member having at least a circumferential wall portion and a top wall portion;
   a light transmitting window formed alongside said circumferential wall portion of said rotary member;
   a scanning mirror disposed on said top wall portion of said rotary member, for deflecting a beam from said light projector radially outward through said light transmitting window;
   a reflecting mirror disposed on said top wall portion of said rotary member, for guiding to the light receiving section light reflected from an object;
   a stator disposed coaxially with, for imparting rotational driving force to, said rotary member;
   a stationary shaft disposed at the center of said stator along the rotational axis of said rotary member, said stationary shaft having an axially extending through-hole;
   a rotational position detector for detecting rotational position of said rotary member, said rotational position detector being connected to the distance computation circuit via a wire extending in said stationary shaft through-hole, for transmitting output signals from said rotational position detector to the distance computation circuit interiorly through said stationary shaft; and
   a photodetector as a component of the light receiving section, disposed on said stationary shaft and connected to the distance computation circuit via a wire extending in said stationary shaft through-hole, for transmitting output signals from said photodetector to the distance computation circuit interiorly through said stationary shaft, wherein said circumferential and top wall portions of said rotary member surround said photodetector.

2. The scanning range sensor according to claim 1, the light receiving section having an upper surface intersecting at the center thereof the rotational axis of said rotary member, further comprising:
   a scanning optical system for guiding a scanning beam from said light projector to said scanning mirror; and
   a receiving optical system for condensing onto the center of the light-receiving-section upper surface received light reflected by said reflecting mirror;
   wherein
   at least one of said scanning optical system and said receiving optical system is housed in a space enclosed by said top and circumferential wall portions of said rotary member, and said photodetector.

3. The scanning range sensor according to claim 1, wherein:
   a bearing is disposed on the outer circumferential surface of the stationary shaft for rotatably supporting said rotary member; and
   a rotor magnet is fixed onto said rotary member so as to face said stator for generating rotational force.

4. The scanning range sensor according to claim 2, wherein:
   said scanning optical system guides along the rotational axis the scanning beam from said light projector so that the scanning beam is while held on the rotational axis incident on said scanning mirror; and
   said receiving optical system guides along the rotational axis light reflected by said reflecting mirror so as to focus along the rotational axis the light onto said photodetector.

5. The scanning range sensor according to claim 1, wherein said light source is one selected from a laser and an LED.

6. A scanning range sensor for determining distance to an object by scanning a beam from a light projector onto the object and receiving in a photodetector connected to a distance computation circuit light reflected from the object, the scanning range sensor comprising:
   a light projector having a light source;
   a rotary member separate from said light projector and rotative about a rotational axis, said rotary member having at least a circumferential wall portion and a top wall portion;
   a stator disposed coaxially with, for imparting rotational driving force to, said rotary member;
   a stationary shaft disposed at the center of said stator along the rotational axis of said rotary member, said stationary shaft having an axially extending through-hole;
   a rotational position detector for detecting rotational position of said rotary member, said rotational position detector being connected to said distance computation circuit via a wire extending in said stationary shaft through-hole, for transmitting output signals from said rotational position detector to the distance computation circuit interiorly through said stationary shaft;
   a photodetector fixedly arranged proximate one end of said stationary shaft, in a position where the center of said photodetector coincides with the rotational axis, and connected to the distance computation circuit via a wire extending in said stationary shaft through-hole, for transmitting output signals from said photodetector to the distance computation circuit interiorly through said stationary shaft;
   a scanning mirror fixed to one wall surface of said rotary member so as to be inclined at a predetermined angle with respect to the rotational axis, for deflecting a scanning beam from said light projector to project the beam radially out of said rotary member into space surrounding the scanning range sensor;
   a reflecting mirror fixed to another wall surface of said rotary member so as to be inclined at a predetermined angle with respect to the rotational axis, for reflecting light received into the scanning range sensor from an object in the surrounding space and guiding the light onto said photodetector; and an optical system for guiding along the rotational axis the scanning beam from said light projector so that the beam is held on the rotational axis while being incident on the scanning mirror; wherein based on said output signals from said photodetector and said rotational position detector the distance computation circuit calculates distance to the object.

7. The scanning range sensor according to claim 6, wherein said rotary member is rotated in one direction continuously.

8. The scanning range sensor according to claim 6, wherein said rotary member is swung in a reciprocating movement within a predetermined angle range.

9. The scanning range sensor according to claim 6, wherein the distance computation circuit calculates distance to objects using an AM modulation method.

10. The scanning range sensor according to claim 6, wherein said rotational position detector is a resolver for detecting rotational angle.

11. The scanning range sensor according to claim 6, wherein:

a bearing is disposed on the outer circumferential surface of the stationary shaft for rotatably supporting said rotary member; and a rotor magnet is fixed onto said rotary member so as to face said stator for generating rotational force, said rotor magnet and said stator therein constituting a motor unit.

12. The scanning range sensor according to claim 6, wherein said light source is one selected from a laser and an LED.

13. A scanning range sensor for determining distance to an object by scanning a beam from a light projector onto the object and receiving in a photodetector connected to a distance computation circuit light reflected from the object, the scanning range sensor comprising:

an outer cover including a cylindrical wall and an annular transparent window in a portion of said cylindrical wall;

a cylindrical rotary member arranged inside said outer cover for being rotated about its rotational axis by a motor unit, said rotary member having at least a circumferential wall portion and a top wall portion;

a light receiving window including an optical lens and formed in said circumferential wall portion of said rotary member at the same height as said transparent window, said optical lens for guiding through said transparent window and said light receiving window, radially into said rotary member, light reflected from an object in the space surrounding the scanning range sensor;

a light projector having a light source and arranged between said outer cover and said cylindrical rotary member;

a stator disposed coaxially with, for imparting rotational driving force to, said rotary member;

a stationary shaft disposed at the center of said stator along the rotational axis of said rotary member, said stationary shaft having an axially extending through-hole;

a rotational position detector for detecting rotational position of said rotary member, said rotational position detector being connected to said distance computation circuit via a wire extending in said stationary shaft through-hole;

a photodetector fixedly arranged proximate an upper portion of said stationary shaft, in a position where the center of said photodetector coincides with the rotational axis, and connected to the distance computation circuit via a wire extending in said stationary shaft through-hole;

a scanning mirror fixed to an outer surface of said top wall portion of said rotary member so as to be inclined at a predetermined angle with respect to the rotational axis, for deflecting a scanning beam from said light projector to project the beam radially out of said rotary member and through said transparent window into the surrounding space;

a reflecting mirror fixed to an inner surface of said top wall portion of said rotary member so as to be inclined at a predetermined angle with respect to the rotational axis, for reflecting light received into said rotary member from said optical lens and guiding the light onto said photodetector to allow the distance computation circuit to calculate distance to the object; and an optical system including at least one mirror arranged on an inner surface of said outer cover, for guiding along the rotational axis the scanning beam from said light projector so as to be along the rotational axis incident on the scanning mirror.

14. The scanning range sensor according to claim 13, wherein said rotary member is rotated in one direction continuously.

15. The scanning range sensor according to claim 13, wherein said rotary member is swung in a reciprocating movement within a predetermined angle range.

16. The scanning range sensor according to claim 13, wherein said rotational position detector is a resolver for detecting rotational angle.

17. The scanning range sensor according to claim 13, wherein:

a bearing is disposed on the outer circumferential surface of said stationary shaft for rotatably supporting said rotary member; and a rotor magnet is fixed onto said rotary member so as to face said stator for generating rotational force, said rotor magnet and said stator therein constituting the motor unit for driving said rotary member about its rotational axis.

18. The scanning range sensor according to claim 13, wherein said light source is one selected from a laser and an LED.

19. A scanning range sensor for determining distance to an object by scanning a beam from a light projector onto the object and receiving in a photodetector connected to a distance computation circuit light reflected from the object, the scanning range sensor comprising:

a motor including a stationary shaft, a stator, and a rotary member rotative on the motor rotational axis and having at least a circumferential wall portion and a first optical through-hole encompassing the rotational axis;

a light receiving window including an optical lens and formed in said circumferential wall portion of said rotary member, said optical lens for guiding through said light receiving window, radially into said rotary member, light reflected from an object in the space surrounding the scanning range sensor;

a light projector including a light source, the light projector being arranged on and fixed to said stationary member;

a photodetector fixedly arranged proximate an upper portion of said stationary shaft, in a position where the center of said photodetector coincides with the rotational axis, and connected to the distance computation circuit by a signal wire;

a scanning mirror fixed to an outer wall surface of said rotary member so as to be inclined at a predetermined angle with respect to the rotational axis, for deflecting a scanning beam from said light projector to project the beam radially out of said rotary member into the surrounding space;

a half-silvered mirror for deflecting onto the rotational axis a scanning beam from said light projector so as to be along the rotational axis incident on the scanning mirror;

a reflecting mirror fixed to an inner wall of the rotary member so as to be inclined at a predetermined angle with respect to the rotational axis, said reflecting mirror having a second optical through-hole encompassing said rotational axis for together with the first optical through-hole permitting the scanning beam deflected by the half-silvered mirror to travel along the rotational axis to the scanning mirror, said reflecting mirror for reflecting light received into said rotary member from said optical lens and guiding the light onto said photodetector to allow the distance computation circuit to calculate distance to the object.

20. The scanning range sensor according to claim 19, wherein a through-hole is formed in said stationary shaft to allow signal wires from said photodetector and said rotational position detector to be connected to the distance computation circuit via the through-hole.

21. The scanning range sensor according to claim 19, wherein said light source is one selected from a laser and an LED.

* * * * *

UNITED STATES PATENT AND TRADEMARK OFFICE
CERTIFICATE OF CORRECTION

| | |
|---|---|
| PATENT NO. | : 7,136,153 B2 |
| APPLICATION NO. | : 10/710726 |
| DATED | : November 14, 2006 |
| INVENTOR(S) | : Mori et al. |

It is certified that error appears in the above-identified patent and that said Letters Patent is hereby corrected as shown below:

On the title page item (73), insert the following: --Hokuyo Automatic Co., Ltd.--

Signed and Sealed this

Twenty-ninth Day of May, 2007

JON W. DUDAS
*Director of the United States Patent and Trademark Office*